United States Patent
Brandt et al.

(10) Patent No.: US 10,975,727 B2
(45) Date of Patent: Apr. 13, 2021

(54) BEARING BUSH OF A TURBOCHARGER AND TURBOCHARGER

(71) Applicant: MAN ENERGY SOLUTIONS SE, Augsburg (DE)

(72) Inventors: Sven Brandt, Munich (DE); Jan-Christoph Haag, Hirschberg (DE); Lutz Aurahs, Langweid (DE); Christoph Heinz, Langenau (DE); Hannes Benetschik, Munich (DE)

(73) Assignee: MAN Energy Solutions SE, Augsburg (DE)

( * ) Notice: Subject to any disclaimer, the term of this patent is extended or adjusted under 35 U.S.C. 154(b) by 113 days.

(21) Appl. No.: 16/171,144

(22) Filed: Oct. 25, 2018

(65) Prior Publication Data
US 2019/0128139 A1    May 2, 2019

(30) Foreign Application Priority Data

Oct. 26, 2017 (DE) .......................... 102017125137.5

(51) Int. Cl.
| | | |
|---|---|---|
| *F01D 25/16* | (2006.01) | |
| *F16C 33/10* | (2006.01) | |
| *F16C 17/18* | (2006.01) | |

(52) U.S. Cl.
CPC ............ *F01D 25/162* (2013.01); *F16C 17/18* (2013.01); *F16C 33/106* (2013.01); *F05D 2220/40* (2013.01); *F05D 2240/54* (2013.01); *F16C 2240/44* (2013.01); *F16C 2360/24* (2013.01)

(58) Field of Classification Search
CPC .. F16C 2360/24; F16C 33/107; F16C 33/106; F16C 33/1065; F16C 17/02; F16C 17/18; F16C 17/246; F16C 32/0629; F01D 25/162; F05D 2240/54; F05D 2220/40; F05D 2240/53; F05D 2250/28
See application file for complete search history.

(56) References Cited

U.S. PATENT DOCUMENTS

| | | | | |
|---|---|---|---|---|
| 2,901,297 | A * | 8/1959 | Sternlicht | F16C 17/028 384/291 |
| 5,480,234 | A * | 1/1996 | Chen | F16C 33/1065 384/313 |
| 6,095,690 | A * | 8/2000 | Niegel | F16C 33/1075 384/293 |
| 7,270,482 | B2 * | 9/2007 | Nanbu | F16C 7/06 123/78 E |
| 7,287,459 | B2 * | 10/2007 | Tabata | F02F 3/105 92/159 |
| 8,202,004 | B2 * | 6/2012 | Koizuka | F16C 33/1065 384/276 |
| 8,708,567 | B2 * | 4/2014 | Lee | F16C 17/02 384/293 |

(Continued)

FOREIGN PATENT DOCUMENTS

EP       2 599 979      6/2013

*Primary Examiner* — Alan B Waits
(74) *Attorney, Agent, or Firm* — Cozen O'Connor

(57) ABSTRACT

A bearing bush of a turbocharger for radially mounting a shaft of the turbocharger. The bearing bush on an inner surface facing the shaft to be mounted, which forms a running surface of the bearing bush, has a microstructuring of multiple cup-shaped recesses at least in sections. The recesses have a maximum depth.

12 Claims, 4 Drawing Sheets

(56) References Cited

U.S. PATENT DOCUMENTS 8,894,285 B2 * 11/2014 Nguyen-Schaefer ........................ F04D 29/063 384/107
2005/0175263 A1 * 8/2005 Nanbu ...................... F16C 7/06 384/12

* cited by examiner

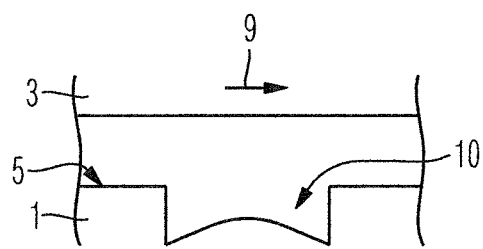
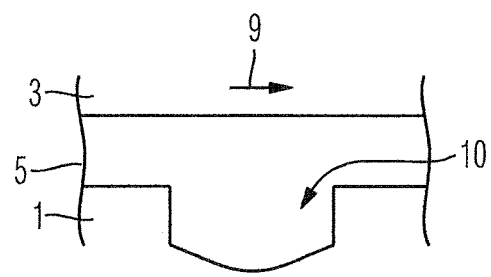
Fig. 4g　　　　　　　　　　Fig. 4h
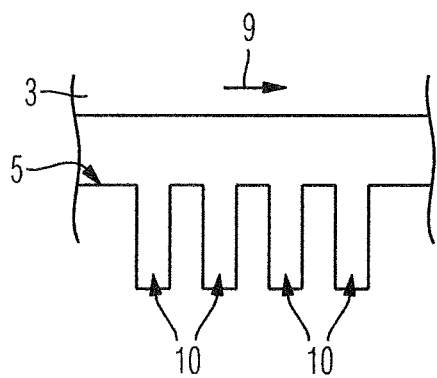
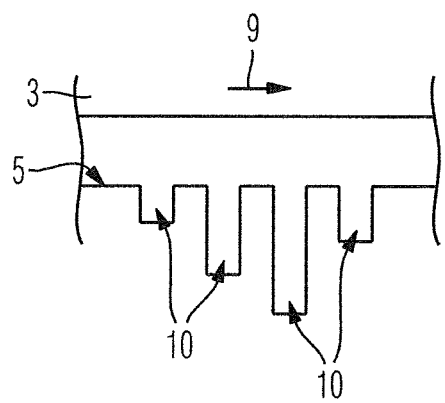
Fig. 5a　　　　　　　　　　Fig. 5b

BEARING BUSH OF A TURBOCHARGER AND TURBOCHARGER

BACKGROUND OF THE INVENTION

1. Field of the Invention

The invention relates to a bearing bush of a turbocharger and to a turbocharger.

2. Description of the Related Art

A turbocharger comprises a compressor and a turbine. In the turbine, a first medium is expanded and energy is extracted in the process. The energy extracted in the turbine is utilised to compress a second medium in the compressor. In the case of an exhaust gas turbocharger, the first medium expanded in the turbine is exhaust gas of an internal combustion engine and the second medium compressed in the compressor is charge air to be fed to an internal combustion engine.

The compressor of a turbocharger comprises a compressor housing and a compressor rotor. The turbine of the turbocharger comprises a turbine housing and a turbine rotor. The compressor rotor and turbine rotor are coupled via a shaft. The shaft is mounted in a bearing housing positioned between the compressor housing and the turbine housing. Here, the shaft is mounted in the bearing housing via radial bearings. The radial bearings are bearing bushes.

An arrangement of a bearing bush and a shaft of a turbocharger to be mounted is known from EP 2 599 979 A2. The shaft is mounted in the bearing bush with a shaft bearing region. In the bearing bush multiple passages are introduced to conduct a lubricant into a lubricating gap. According to EP 2 599 979 A2, the shaft bearing region of the shaft, which is guided in the bearing bush, is subdivided into multiple sections, namely into two outer sections and one inner section, wherein at least one of the outer sections has a microstructure on its surface. Especially in the start-stop operation, turbochargers are exposed to a high wear in the region of their bearing bushes serving as radial bearings. In the start-stop operation, a bearing bush is exposed to high loads because of the absence of hydrostatics. This leads frequently to a failure of the bearing bushes.

SUMMARY OF THE INVENTION

There is a need for a bearing bush of a turbocharger which is characterized by low wear and for a turbocharger having such a bearing bush. Starting out from this, the present invention is based on the object of creating a new type of bearing bush.

According to one aspect of the invention, the bearing bush, on an inner surface facing the shaft to be mounted, which forms a running surface of the bearing bush, comprises a microstructuring of multiple cup-shaped recesses, at least in sections. The recesses of the microstructuring have a maximum depth, so that the following applies:

$$V = s_{LW}/t_{MAX} \geq 0.1$$

and/or $$Re = (h_{SS}+t_{MAX})^* v_{MAX}/v_{SM} \leq 1{:}800,$$

wherein
$s_{LW}$ is the absolute radial clearance between bearing bush and shaft,
$t_{MAX}$ is the maximum depth of the cup-shaped recesses,
$h_{SS}$ is the minimum lubricating gap height between bearing bush and shaft,
$v_{MAX}$ is the maximum circumferential speed of the shaft,
$v_{SM}$ is the kinematic viscosity of a lubricant utilised for the lubrication.

Through the microstructuring of the running surface of the bearing bush, the susceptibility to wear of the same in particular in the start-stop operation can be significantly reduced. Here it is significant that the maximum depth of the cup-shaped recesses of the microstructuring fulfils at least one, preferably both of the above conditions.

According to an advantageous further development the following applies:

$$0.1 \leq V \leq 10$$

and/or $$Re = (h_{SS}+t_{MAX})^* v_{MAX}/v_{SM} \leq 1800$$

Such a microstructuring is particularly preferred for reducing the susceptibility to wear of the bearing bush in particular during the start-stop operation of the turbocharger.

Preferentially, the microstructuring is at least introduced into such sections of the running surface of the bearing bush as are positioned in the region of a converging lubricating gap between bearing bush and shaft. The load capacity of the bearing is created in the converging lubricating gap. At least in the region of the converging lubricating gap, the microstructuring is therefore introduced into the running surface of the bearing bush.

Preferentially, the microstructuring is introduced into the running surface of the bearing bush outside of lubricating pockets. In particular when the microstructuring is introduced, except for the lubricating pockets, into the entire region of the running surface of the bearing bush, the bearing bush can be easily produced and makes possible a reduction of the susceptibility to wear of the bearing bush even when the same can rotate.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

FIG. 4a-4h are each a cross section through a cup-shaped recess;
and
FIG. 5a-b are cross sections through multiple cup-shaped recesses each.

DETAILED DESCRIPTION OF THE PRESENTLY PREFERRED EMBODIMENTS

Figure 1:
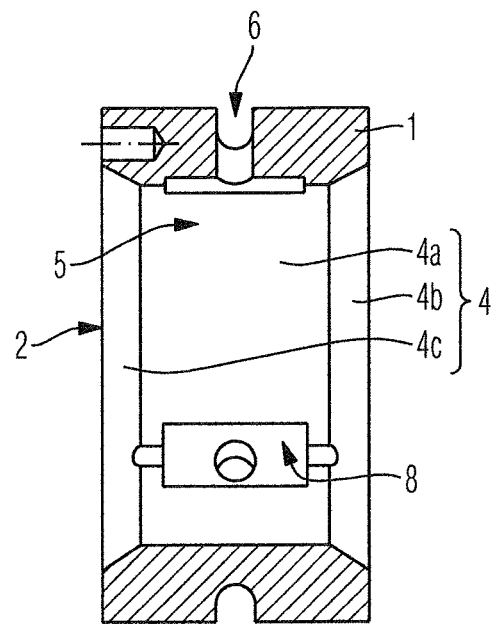
FIG. 1 is an axial section through a bearing bush.
Figure 2:
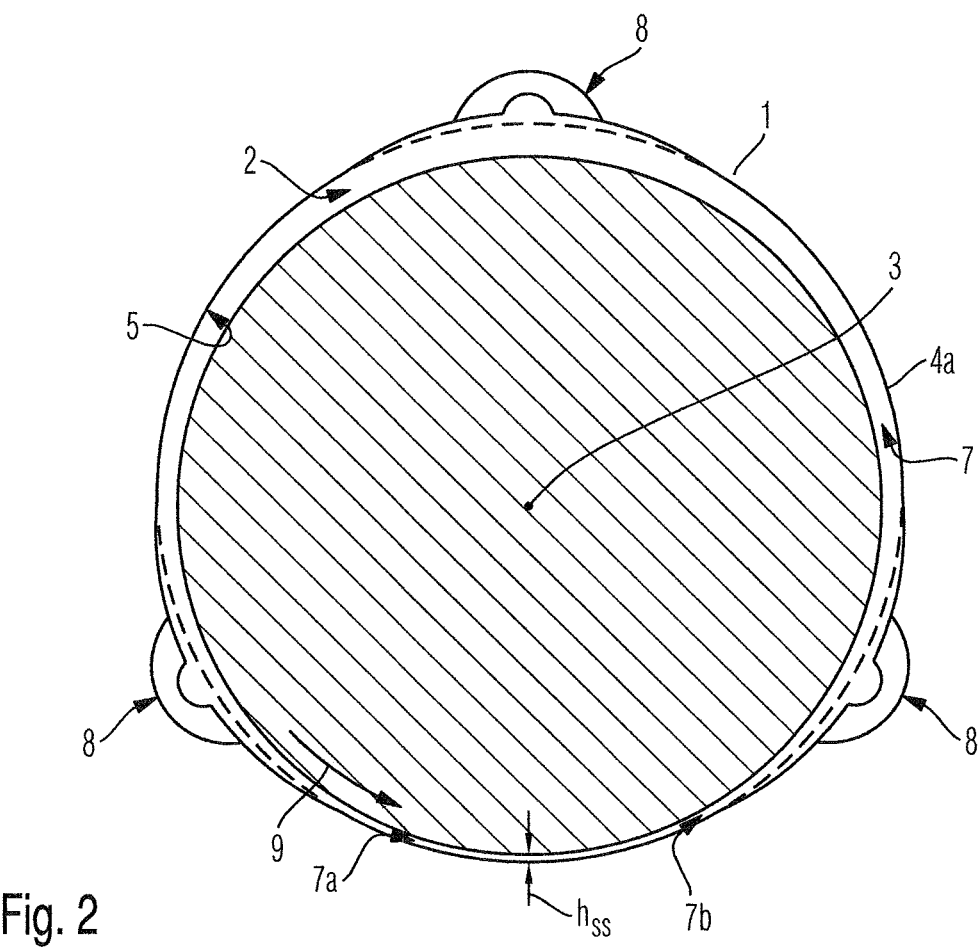
FIG. 2 is a radial section through a bearing bush together with a mounted shaft.

The invention relates to a bearing bush of a turbocharger for the radial mounting of a shaft of the turbocharger. The fundamental construction of such a bearing bush is shown in FIG. 1. Accordingly, FIG. 1 shows a bearing bush 1 in cross section, which comprises a recess 2 for guiding and mounting a shaft 3. FIG. 2 shows a cross section rotated by 90° through the bearing bush 1 together with the shaft 3.

The recess 2 of the bearing bush 1, which serves for guiding and mounting the shaft 3, is bounded by an inner surface 4 seen in the axial section of FIG. 1, which in the middle comprises a cylindrically contoured section 4a and at axial ends sections 4b-4c that are contoured conically or truncated-cone like. The cylindrically contoured section 4a of the inner surface 4 of the running bush 1 defines a running surface 56 of the bearing bush 1.

As is evident from FIG. 1, lubricating passages 9 extending in the radial direction are introduced into the bearing bush 1, which serve for supplying the bearing bush 1 with a lubricant. Accordingly, a lubricating gap 7 is formed between the running surface 5 of the bearing bush 1 and the shaft to be mounted, which is to be supplied with the lubricant. The lubricating passage 6 extend in the radial direction through the bearing bush 1 and lead into the lubricating pockets 8 in the region of the running surface 5. In the exemplary embodiment, three such lubricating pockets 8 are distributed over the circumference of the bearing bush 1, which serve for supplying the lubricating gap 7 with lubricant.

FIG. 2 shows a possible relative position between shaft 3 and running surface 5 of the bearing bush 1 that can form during the operation. Accordingly, it is evident from FIG. 2, that the lubricating gap 7 seen in the circumferential direction does not have a uniform dimension but that the radial thickness of the lubricating gap 7 changes. In FIG. 2, the dimension $h_{SS}$ characterises the so-called minimum bearing clearance between the running surface 5 of the bearing bush 1 and the shaft 3. Seen in the direction of rotation and thus in the movement direction 9 of the shaft 3, the lubricating gap 7 has a lubricating gap section 7a, which converges in the direction of this minimum bearing clearance $h_{SS}$, and a lubricating gap section 7b, that seen in the movement direction 9 diverges away from this minimum bearing clearance $h_{SS}$.

In the case of the bearing bush 1 according to one aspect of the invention, the running surface 5 of the bearing bush 1 comprises a microstructuring of multiple cup-shaped recesses 10 at least in sections. The recesses 10 have a maximum depth so that the following applies:

$$V = s_{LW}/t_{MAX} \geq 0.1$$

and/or $$Re = (h_{SS} + t_{MAX}) * v_{MAX}/v_{SM} \leq 1{:}800,$$

wherein
$s_{LW}$ is the absolute clearance between bearing bush 1 and shaft 3,
$T_{MAX}$ is the maximum depth of the cup-shaped recesses 10,
$h_{SS}$ is the minimum load clearance between bearing bush 1 and shaft 3,
$v_{MAX}$ is the maximum circumferential speed of the shaft 3,
$v_{SM}$ is the kinematic viscosity of a lubricant utilised for the lubrication.

The absolute clearance between bearing bush 1 and shaft 3 is the difference between an inner diameter of the running surface 5 of the bearing bush 1 and an outer diameter of the section of the shaft 3 mounted in the bearing bush 1. Preferentially, the following applies:

$$0.1 \leq V \leq$$

and/or $$Re = (h_{SS} + t_{MAX}) * v_{MAX}/v_{SM} \leq 1800.$$

The bearing bush 1 is less susceptible to wear in particular when the cup-shaped recesses 10 of the microstructuring fulfil at least one, preferentially both of the above conditions.

As already explained, the microstructuring is introduced into the running surface of the bearing bush 1 at least in sections.

Here, the microstructuring is introduced at least into such sections of the running surface 5 of the bearing bush 1 as are positioned in the region of the converging lubricating gap section 7a between bearing bush 1 and shaft 3 or bound the converging lubricating gap section 7a on the outside.

The microstructuring, seen in the circumferential direction, can also be introduced into the running surface over the entire region of the running surface 5 except for the lubricating pockets 8.

FIGS. 3a, 3b, 3c and 3d each show in radial viewing direction a plan view of a section of the running surface 5 of the bearing bush 1, which comprises cup-shaped recesses 10 for providing the microstructuring.

Figure 3A:
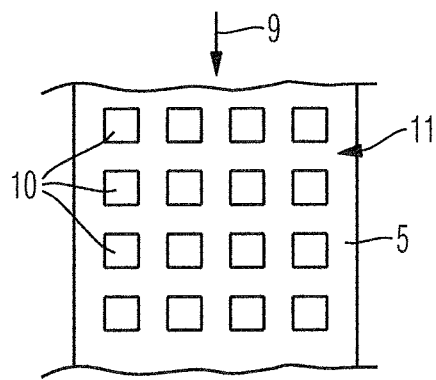
FIG. 3a-3d are different types of microstructuring of multiple cup-shaped recesses in plan view.
Figure 3B:
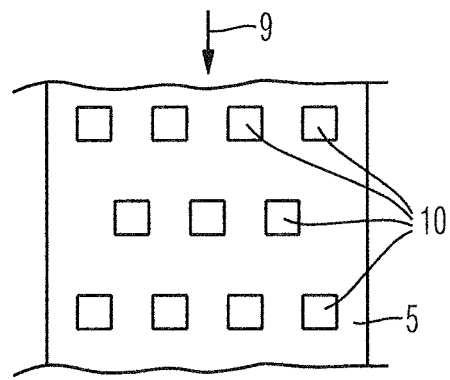
Figure 3C:
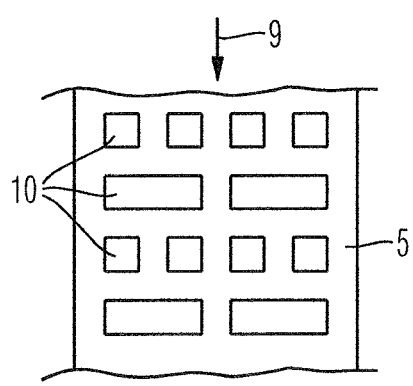
Figure 3D:
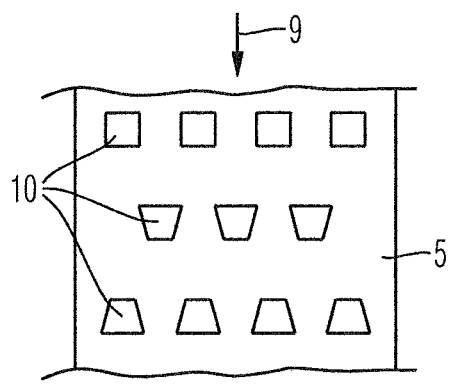

In FIG. 3a, these cup-shaped recesses 10 are arranged in the form of columns and rows forming a cluster 11, wherein in FIG. 3a in each column or each row the recesses 10 are arranged equidistantly relative to one another and wherein seen in the plan view, the cup-shaped recesses 10 are all rectangularly contoured identically. In FIG. 3b, a modification is shown in which all recesses are rectangularly contoured in the plan view but the recesses 10, based on directly adjacent rows, are linearly offset relative to one another. In FIG. 3c, all cup-shaped recesses 10 in turn are contoured rectangularly, but have contours in the plan view that deviate from one another in their size. In FIG. 3d, not only rectangular, cup-shaped recesses are shown but additionally cup-shaped recesses which are contoured trapezoidally, namely both convergingly and divergingly seen in the movement direction 9 of the shaft 3. The invention is not limited to rectangularly or trapezoidally contoured cup-shaped recesses 10, but the cup-shaped recesses can rather also be contoured triangularly, round, circularly, elliptically, or the like. The cup-shaped recesses 10 cannot only be linearly offset relative to one another seen in the movement direction 9 of the rotating shaft 3 and seen transversely to the movement direction 9 of the shaft 3 but the cup-shaped recesses can also be twisted relative to one another.

FIGS. 4a, 4b, 4c, 4d, 4e, 4f, 4g and 4h each show possible cross section through a cup-shaped recess 10 of the microstructuring on the running surface 5 of the bearing bush 1.

Figure 4A:
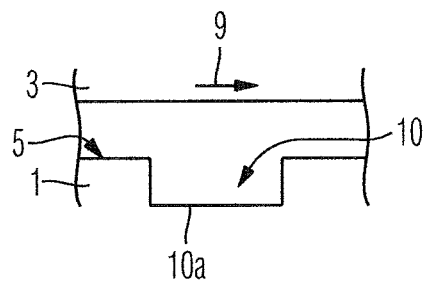
Figure 4B:
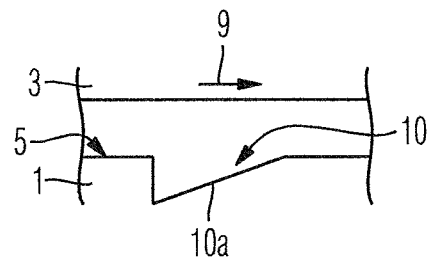
Figure 4C:
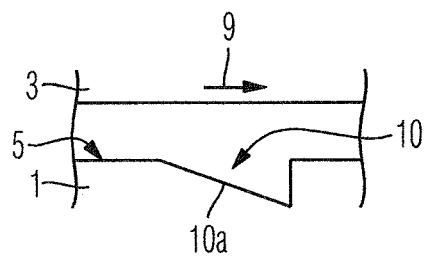
Figure 4D:
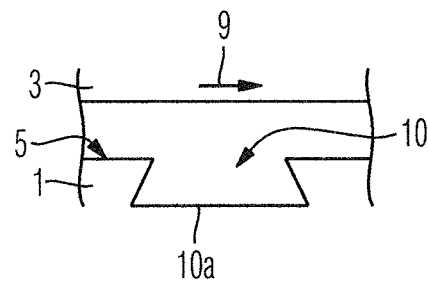
Figure 4E:
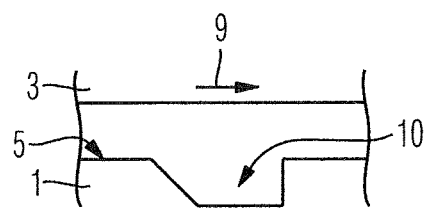
Figure 4F:
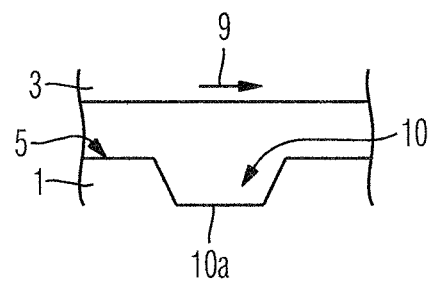

In FIG. 4a, the cup-shaped recess 10 is contoured rectangularly, namely with a groove base 10a that is constant seen in the movement direction 9 and thus a constant depth of the cup-shaped recess 10 seen in the movement direction 9. The groove base 10a and thus the depth of the cup-shaped recess 10 is also constant in the movement direction 9 in FIG. 4d, likewise in FIG. 4f, wherein however in FIGS. 4d and 4f boundaries adjoining the groove base 10a do not run perpendicularly to the groove base 10a but are inclined relative to the same. In FIGS. 4b and 4c as well as in FIG. 4e, the groove base 10 is inclined in the movement direction 9 at least in sections, so that in FIG. 4b the depth of the cup-shaped recess 10 seen in the movement direction 9 changes convergingly and in FIGS. 4c and 4e divergingly. In FIGS. 4g and 4h, the groove base 10a of the respective cup-shaped recess 10, in contrast with the exemplary embodiments of FIGS. 4a to 4f, is not contoured linearly but rather curved, namely in FIG. 4g curved towards the outside in the direction of the shaft 3 and in FIG. 4h curved towards the inside away from the shaft 3.

FIG. 5a, 5b show a cross section through the bearing bush 4a and shaft 3 analogously to the FIGS. 4a to 4h, however not through a cup-shaped recess 10, but in each case through multiple cup-shaped recesses 10 which seen in the movement direction 9 of the shaft 3 are positioned one behind the other. In FIG. 5a, all cup-shaped recesses 10 have an identical depth while in FIG. 5b the depth of the cup-shaped recesses 10 varies.

Accordingly, the invention relates to a bearing bush 1 for a turbocharger having a defined microstructuring in the region of its running surface 5. A shaft section of the shaft 3 mounted in the bearing bush 1 can be embodied smooth or likewise have a microstructuring.

With the microstructuring of the running surface 5 of the bearing bush 1, the susceptibility to wear of the bearing bush 1 is reduced in particular during the start-stop operation.

The cup-shaped recesses 10 form a type of lubricant reservoir for the start-stop operation. Furthermore, the cup-shaped recesses 10 improve the rotor-dynamic support behaviour. On the whole, the rotor-dynamic behaviour of the bearing bush 1 can be improved. The susceptibility to wear of the bearing bush 1 is reduced.

The bearing bush 1 can be secured against rotation or alternatively rotate relative to the shaft 3.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A bearing bush of a turbocharger configured to radially mount a shaft of the turbocharger, comprising:
    an inner surface of the bearing bush facing the shaft to be mounted, which forms a running surface of the bearing bush;
    at least one lubricating pocket arranged in the running surface of the bearing bush;
    a radially extending lubricating passage configured to supply a lubricant;
    a microstructuring arranged in the running surface of the bearing bush outside lubricating pockets configured as multiple cup-shaped recesses at least in sections of the inner surface of the bearing bush,
    wherein the cup-shaped recesses have a maximum depth, such that:

$$s_{LW}/t_{MAX} \geq 0.1 \text{ and/or}$$

$$(h_{SS}+t_{MAX})^* v_{MAX}/v_{SM} \leq 1800,$$

wherein:
   $s_{LW}$ is an absolute clearance between the bearing bush and the shaft,
   $t_{MAX}$ is a maximum depth of the cup-shaped recesses,
   $h_{SS}$ is a minimum bearing clearance between the bearing bush and the shaft during operation,
   $v_{MAX}$ is a maximum circumferential speed of the shaft, and
   $v_{SM}$ is a kinematic viscosity of the lubricant utilised for lubrication.

2. The bearing bush according to claim 1, wherein the microstructuring is provided at least into sections of the running surface of the bearing bush that are positioned in a region of a converging lubricating gap section between the bearing bush and the shaft.

3. The bearing bush according to claim 1, wherein the depth of the cup-shaped recesses varies between respective cup-shaped recesses.

4. The bearing bush according to claim 1, wherein in a radial viewing direction in plan view of the cup-shaped recesses a contour of a respective cup-shaped recesses varies.

5. The bearing bush according to claim 1, wherein each of the cup-shaped recesses are contoured one of: rectangularly, triangularly, trapezoidally, and round.

6. The bearing bush according to claim 1, wherein in an axial viewing direction a cross-sectional surface of the cup-shaped recesses varies.

7. The bearing bush according to claim 1, wherein seen in a direction of rotation of the shaft, wherein at each respective point along a groove base of the cup-shaped recesses extends, linearly and/or curved with a constant and/or increasing and/or decreasing depth.

8. The bearing bush according to claim 1, wherein the cup-shaped recesses of the microstructuring forms at least one cluster of equidistant or non-equidistant recesses, wherein the recesses in the respective cluster are linearly offset relative to one another.

9. The bearing bush according to claim 1, wherein the at least one lubricating pocket comprises at least a lead in region a center region and a lead out region, wherein the center region has a greater redial depth than the lead in region and the lead out region.

10. The bearing bush according to claim 9, wherein the lead in region and the lead out region have radially increasing depths that increase circumferentially towards the center region.

11. The bearing bush according to claim 1, wherein the cup-shaped recesses of the microstructuring forms at least one cluster of equidistant or non-equidistant recesses, wherein the
    recesses in the respective cluster are twisted relative to one another.

12. A turbocharger, comprising:
    a shaft;
    a turbine for expanding a first medium comprising:
        a turbine rotor;

a compressor for compressing a second medium utilising energy extracted in the turbine during the expansion, comprising:
    a compressor rotor that is coupled to the turbine rotor via the shaft; and
at least one bearing bush configured to radially mount the shaft, wherein
an inner surface of the bearing bush facing the shaft to be mounted, which forms a running surface of the bearing bush;
at least one lubricating pocket arranged in the running surface of the bearing bush;
a radially extending lubricating passage configured to supply a lubricant;
a microstructuring arranged in the running surface of the bearing bush outside lubricating pockets configured as multiple cup-shaped recesses at least in sections of the inner surface of the bearing bush, wherein the cup-shaped recesses have a maximum depth, such that:

$$s_{LW}/t_{MAX} \geq 0.1 \text{ and/or}$$

$$(h_{SS}+t_{MAX})*v_{MAX}/v_{SM} \leq 1800,$$

wherein:
  $s_{LW}$ is an absolute clearance between the bearing bush and the shaft,
  $t_{MAX}$ is a maximum depth of the cup-shaped recesses,
  $h_{SS}$ is a minimum bearing clearance between the bearing bush and the shaft during operation,
  $v_{MAX}$ is a maximum circumferential speed of the shaft, and
  $v_{SM}$ is a kinematic viscosity of the lubricant utilised for lubrication.

* * * * *